July 3, 1951 D. E. BRAMBLE 2,558,926
CONVERTIBLE TOP STRUCTURE
Filed Oct. 31, 1947 2 Sheets—Sheet 1
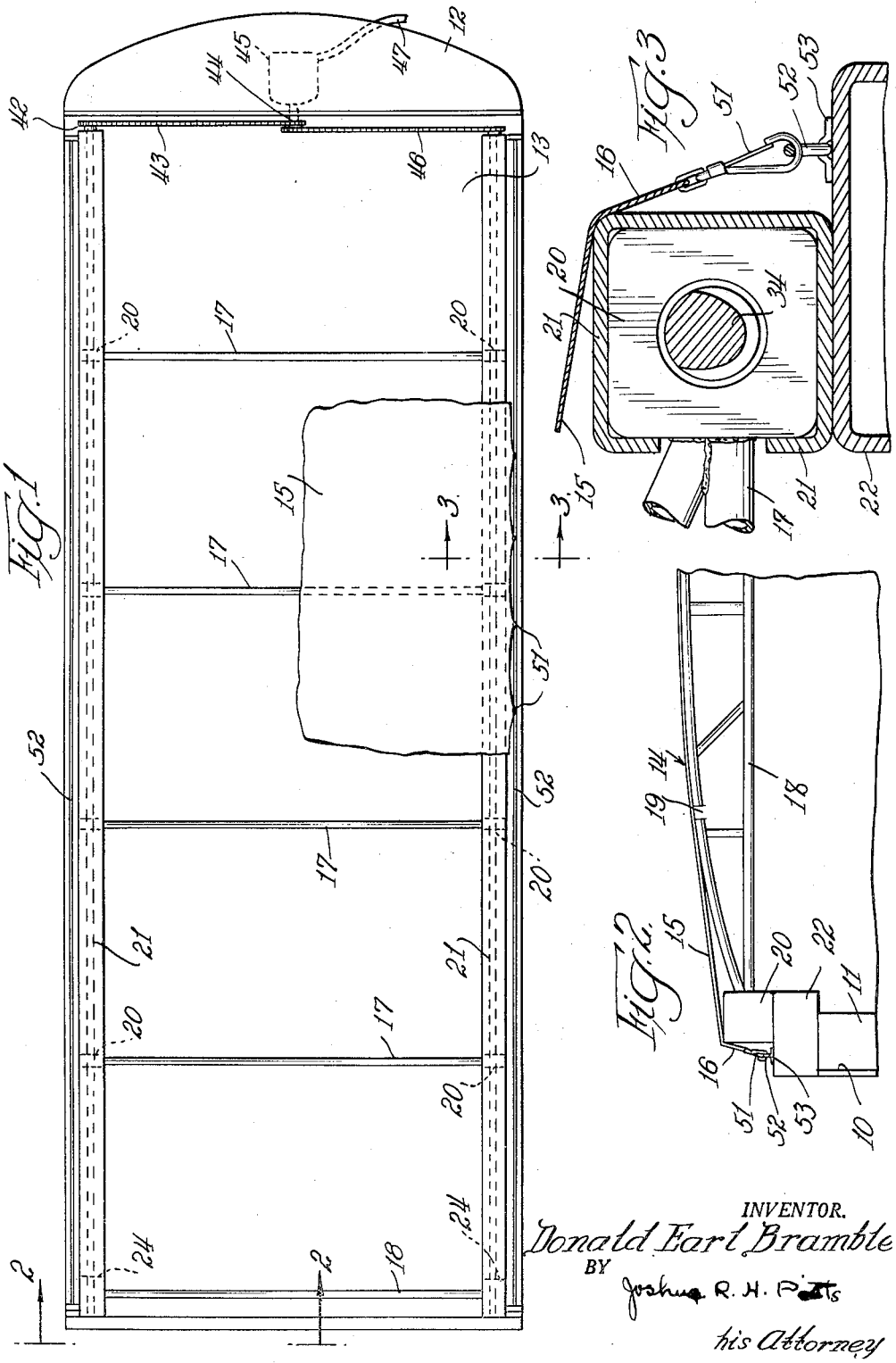
INVENTOR.
Donald Earl Bramble
BY Joshua R. H. Pitts
his Attorney July 3, 1951     D. E. BRAMBLE     2,558,926
CONVERTIBLE TOP STRUCTURE
Filed Oct. 31, 1947     2 Sheets-Sheet 2
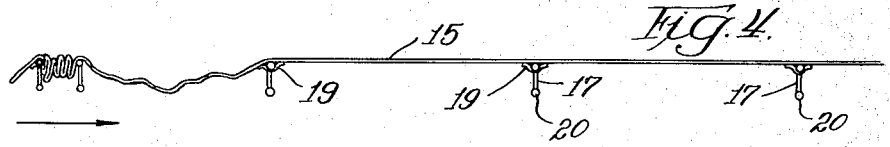
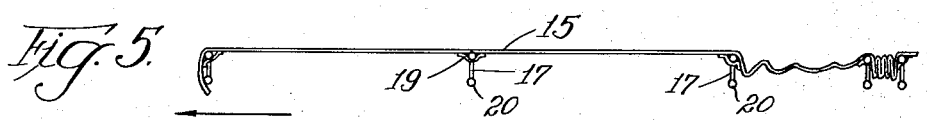
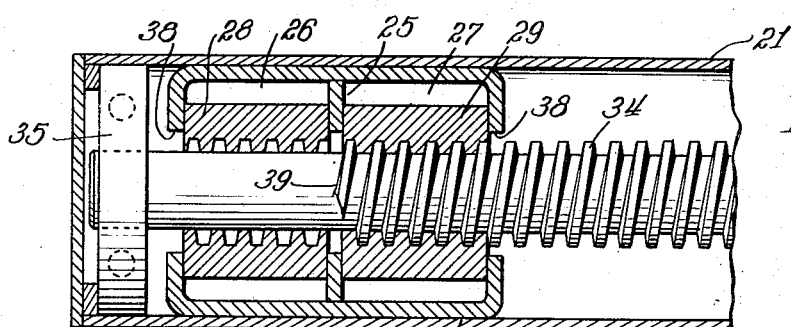
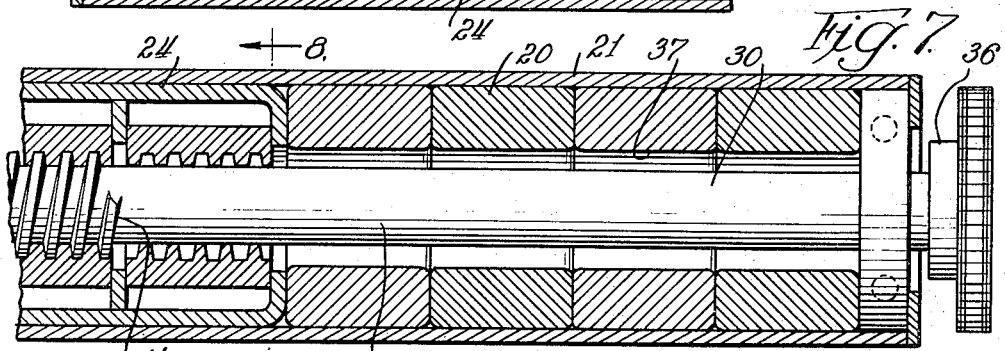
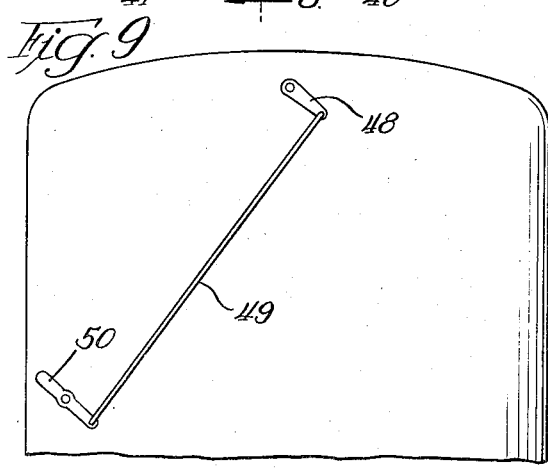
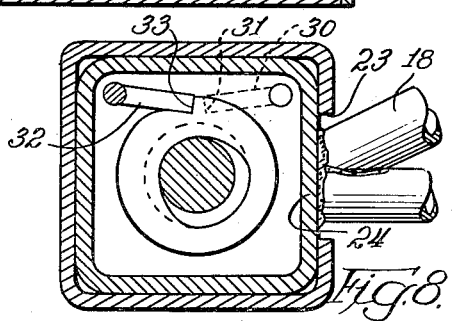
INVENTOR.
Donald Earl Bramble
BY Joshua R. H. Potts
his Attorney Patented July 3, 1951

2,558,926

UNITED STATES PATENT OFFICE 2,558,926

CONVERTIBLE TOP STRUCTURE

Donald E. Bramble, Chicago, Ill.

Application October 31, 1947, Serial No. 783,345

3 Claims. (Cl. 296—105)

This invention relates to convertible top structures for trailer or truck bodies, and has for an object the provision of new and improved structures of this character.

In my Patent No. 2,406,737, issued September 23, 1946, and in my application filed May 7, 1947, Serial 746,501, now Patent 2,496,437, I have shown convertible top structures, and the present invention is directed to improvements over these structures, as well as over all other structures of which I have knowledge.

It is an object of the present invention to provide a flexible convertible top structure, controlled by power operated mechanism, adapted to form a covering for the normal open-top of a vehicle body, or to be collapsibly removed to an out-of-the-way position, and in which the actuating mechanism is substantially confined to the upper margins of the side walls of the vehicle body.

Another object of the invention is to provide screw and nut actuating mechanism, operable to shift the convertible top structure in the manner desired, and wherein the actuating mechanism is driven by a compressed air motor connected to the brake system.

Still another object of the invention is to provide screw and nut actuating mechanism of the character referred to, having means for automatically limiting the travel thereof, regardless of continued operation of the driving mechanism.

A still further object of the invention is to provide means for movably confining the marginal edges of the convertible top while permitting shifting thereof, and in which the confining means are offset inwardly from the side walls of the vehicle body to remove the same from danger of injury.

Other and further objects of the invention will appear from the following specification and attached claims, and from the accompanying drawings, in which:

Figure 1 is a top plan view of a truck or trailer body showing the invention applied thereto, Figure 2 is a fragmentary rear elevational view, corresponding substantially to the line 2—2 of Figure 1, Figure 3 is an enlarged fragmentary vertical sectional view through one corner of the vehicle body construction, and corresponding substantially to the line 3—3 of Figure 1, Figure 4 shows a fragmentary, somewhat diagrammatic view of the convertible cover, disclosing movement of the mechanism, in the direction of the arrow to collapse the top structure, Figure 5 is a view similar to Figure 4, showing the mechanism moving oppositely, in the direction of the arrow, to stretch the top in its closing function, Figure 6 is an enlarged fragmentary, vertical sectional view, of the screw operated mechanism, showing the same at the end of its top stretching movement, Figure 7 is a view similar to Figure 6, showing the screw operated mechanism at the limit of its opposite movement, Figure 8 is a fragmentary transverse sectional view of the operating mechanism, corresponding substantially to the line 8—8 of Figure 7, while Figure 9 is an end elevational view of the vehicle body, and showing the motor control mechanism.

As shown in the drawings, the vehicle body to which the invention is applied, may be of conventional design having the usual floor, not shown, and side walls 10—10, braced by side posts 11—11. The end portion 12, however, may be of relatively shallow rounded configuration, to leave a maximum sized opening 13, which will be little restricted by the presence of the convertible top structure, which is indicated generally by the reference character 14.

The top structure 14 includes an oblong flexible cover, or tarpaulin sheet 15, of a size long enough to cover the opening 13 from end to end, and of sufficient width to provide side margins 16—16. At intervals along the underside of the flexible cover 15, there are provided bow-shaped cross members 17 and 18, to the upper surfaces of each of which, the covering or tarpaulin 15 is attached by suitable fasteners 19—19. To the opposite ends of each of the bow members 17 there are attached block-shaped shoes 20—20. The shoes 20—20 of each of the cross members 17—17 are slidably accommodated in longitudinally extending, elongated, spaced guide members 21—21. The guide members 21—21, are substantially square in cross section, and are fixedly secured to upper surfaces of top rails 22—22, which are secured to the side wall structures 10—10 of the vehicle body. The guide members 21—21 are spaced inwardly from the outer margins of the top rails 22—22, for a purpose presently to appear. The guide members 21—21 are slotted along their inner sides, throughout their lengths, as indicated at 23, to provide slots affording clearance for the contiguous portions of the cross members 17, and to permit these members, and the shoes 20—20 carried thereby to be moved freely along the guide members 21—21.

The cross member 18 is the actuated member, and has its opposite ends each welded to an actuating member 24. The members 24 are hollow, square in cross section, and each slidably mounted in one of the guide members 21—21. The parts associated with each of the guide members 21—21 are alike, and only one group will be described in detail, the same reference characters being employed for like parts of each. Each actuating member 24 has a partition 25, providing chambers 26 and 27. The chamber 26 houses a nut 28, and the chamber 27, houses a nut 29. A pawl 30 is pivotally carried by the actuating member 24, within the chamber 26, and is adapted to engage a notch 31 in the nut 28 to prevent rotation of the nut 28 in a clock-wise direction, as viewed in Figure 8. A pivoted pawl 32 is carried within the chamber 27 for engagement with a notch 33 in the nut 29, preventing counter-clock-wise rotation of the nut 29, as viewed in Figure 8.

The nuts 28 and 29 are adapted to be threaded on an elongated worm or screw shaft 34. The worm shaft 34 is rotatably supported at one end in a bearing 35, and at its opposite end in the bearing 36. The worm shaft 34 extends freely through openings 37 in the shoes 20—20, and freely through openings 38—38 in the actuating member 24. For a portion of the shaft 34, adjacent to the bearing 35, the thread on the shaft is omitted, the worm terminating in a tapered formation, as indicated at 39. The opposite end of the shaft 34 also has the worm omitted along the portion indicated at 40, the terminal end of the worm being tapered, as indicated at 41.

The shaft 34, adjacent to the bearing 36, is provided with a sprocket wheel 42, over which is trained a sprocket chain 43, the chain being driven by a sprocket wheel 44, attached to the arbor of a reversible compressed air motor or actuating means 45. A second sprocket wheel is secured to the motor shaft and drives the mechanism associated with the other guide means through a chain and sprocket connection indicated at 46. The motor 45 may be of a well known type, and connected to the source of compressed air of the brake system associated with the trailer, a pipe 47 being shown for thus effecting this connection. A motor of this type is provided with a valve, not shown, which when moved in one direction effects rotation of the motor shaft in one direction, and when moved oppositely past a neutral position reverses rotation of the motor arbor; of course, in a neutral position the motor is at rest. Referring to Figure 9, the control valve of the motor 45, may be provided with a lever 48, connected by a link 49 to an operating handle 50, this mechanism being located on the end wall of the truck or trailer body in a convenient position for manipulation.

For holding down the marginal side edges of the flexible cover or tarpaulin 15, I provide these edges with a plurality of harness snaps 51, which are snapped over cables 52, secured at their ends to brackets 53, fixed to the top surfaces of the top rails 22, and within the space provided by inwardly offsetting the guide members 21, as previously referred to.

In operation, and assuming the flexible top structure 15, and the cross members 17 and 18, to be withdrawn to expose the opening 13, and it is desired to extend the structure to form the top or roof of the vehicle body, the motor 45 is actuated, and through chains 43 and 46, rotates the shafts 34 in clock-wise directions, as in Figure 8. The actuating members 24, and the cross member 18 connected therewith, through travel of the nuts 28, on the shafts 34, causes travel of the cross member 18 in the direction of the arrow, shown in Figure 5.

The covering 15, through its connection with the cross members 17, pulls these members along the guides, 21—21, first the nearest, and then the next, and so on, in the manner indicated in Figure 5. When the actuating members 24 have pulled the members 17 and 18 to the limit of the travel, that is, until the covering 15 is stretched throughout, the nuts 28 leave the threads of the worm shafts 34, coming to rest, and the nuts 29 are free to rotate with the shafts 34, thereby making it unnecessary to stop rotation of the shafts 34 and the motor shaft at any particular time. When the motor 45 is reversed, the actuating members 24 are picked up by the nuts 29, causing travel in an opposite direction, approach of the shoes 20—20, and folding of the covering 15 between cross members 17 and 18, as indicated in Figure 4, until the nuts 29 leave the shafts 34, leaving only the nuts 28 in engagement with the shafts 34, these nuts being then free to rotate with the shafts, in the manner before explained. During its travel the covering structure 15 has its edges held down by the harness snaps 51 which slide along the cables 52 as will be understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim is:

1. A construction of the character described, comprising; an open-sided enclosure; flexible covering means adapted to close the open side of said enclosure; operating means confined adjacent to the open side of said enclosure, and operable to close or open said open side, a screw stem included as a part of said operating means, power mechanism for driving said stem, a pair of nuts associated with said stem and connected to said covering means, and means for rendering one of said nuts effective depending on the direction of rotation of said stem.

2. A construction of the character described, comprising: an enclosure having an open side; a covering adapted to open or close said opening and having a movable end; screw and nut means for shifting said movable end of said covering, and including a screw mounted on said enclosure and held against longitudinal movement relative thereto, and a pair of nuts adapted to be threaded upon said screw and connected to said movable end; and means for confining rotation of one of said nuts in one direction and the other of said nuts in the opposite direction.

3. A construction of the character described, comprising: a vehicle body having side walls and normally open at the top; top rails fixed to the upper edges of said side walls; hollow guides fixed to the upper surfaces of said side rails and inwardly of said side walls of said top rails; guide cables carried by said top rails between said hollow guides and the outer margins of said top rails; a flexible covering adapted to cover the open top of said vehicle body; harness snaps connected to the edges of said covering and snapped over said guide cables; cross members having end portions movably mounted in said hollow guides and connected to said covering; actuating means in said hollow guides connected to a predetermined cross member; a pair of nuts carried by said actuating means, one of said nuts held against rotation in one direction and the other held against rotation in the opposite direction; and an operating screw having threaded engagement with said nuts.

DONALD E. BRAMBLE.

REFERENCES CITED

The following references are of record in the file of this patent:

UNITED STATES PATENTS

| Number | Name | Date |
| --- | --- | --- |
| 1,863,957 | Woolcott | June 21, 1932 |
| 2,068,041 | Tate | Jan. 19, 1937 |
| 2,239,888 | Forrester | Apr. 29, 1941 |
| 2,309,926 | Baker | Feb. 2, 1943 |
| 2,406,737 | Bramble | Sept. 3, 1946 |
| 2,409,516 | Rosenthal et al. | Oct. 15, 1946 |
| 2,460,613 | Whelan et al. | Feb. 1, 1949 |

FOREIGN PATENTS

| Number | Country | Date |
| --- | --- | --- |
| 5,228 | Great Britain | Sept. 14, 1889 |
| 18,301 | France | Mar. 23, 1914 |